United States Patent
Haridass

(10) Patent No.: US 11,315,134 B1
(45) Date of Patent: Apr. 26, 2022

(54) REDEMPTION CODE AUTO-COMPLETE FOR ONLINE OFFERS AND TRACKING

(71) Applicant: Google LLC, Mountain View, CA (US)

(72) Inventor: Prasad Haridass, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 801 days.

(21) Appl. No.: 13/837,847

(22) Filed: Mar. 15, 2013

(51) Int. Cl.
   *G06Q 30/02* (2012.01)
(52) U.S. Cl.
   CPC ................ *G06Q 30/0222* (2013.01)
(58) Field of Classification Search
   CPC ............ G06Q 30/0239; G06Q 30/0222
   See application file for complete search history.

(56) References Cited

U.S. PATENT DOCUMENTS

| | | | | |
|---|---|---|---|---|
| 9,727,891 | B2 * | 8/2017 | Mezzacca | G06Q 30/02 |
| 2002/0046138 | A1 * | 4/2002 | Fitzpatrick | G06Q 30/02 705/26.1 |
| 2003/0172005 | A1 * | 9/2003 | Hellal | G06Q 30/02 705/14.51 |
| 2005/0197893 | A1 | 9/2005 | Landau et al. | |
| 2008/0021771 | A1 * | 1/2008 | Wu | G06Q 30/00 705/14.23 |
| 2008/0313323 | A1 * | 12/2008 | Morris | G06Q 30/06 709/224 |
| 2009/0271263 | A1 * | 10/2009 | Regmi | G06Q 20/209 705/14.17 |
| 2009/0300476 | A1 * | 12/2009 | Vogel | G06Q 30/0601 715/234 |

(Continued)

FOREIGN PATENT DOCUMENTS

WO  WO-2009029940 A1 *  3/2009  ......... G06Q 30/0641

OTHER PUBLICATIONS

"CouponFollow" webpage <http://couponfollow.com/docs/addon>, 4 pages, Feb. 18, 2012. Retrieved from the Internet Archive Wayback Machine <https://web.archive.org/web/20120218230349/http://couponfollow.com/docs/addon> on Jun. 5, 2021. (Year: 2012).*

(Continued)

*Primary Examiner* — Abhishek Vyas
*Assistant Examiner* — Monica A Mandel
(74) *Attorney, Agent, or Firm* — Dority & Manning, P.A.

(57) ABSTRACT

Auto-detecting an electronic shopping basket and auto-completing offer redemption codes on the shopping basket webpage. When the user selects an item to add to the shopping basket, the shopping basket webpage loads. A plug-in detects a load event and communicates that information to an offer system. The offer system reviews the information, identifies the merchant, and determines offer codes applicable to a purchase. The offer system communicates the offer code to the plug-in, which auto-completes the code on the electronic shopping basket. The user completes the online transaction and the merchant provides a notification of completed transaction webpage. The plug-in detects a load event for the completed transaction webpage and communicates information regarding the load event to the offer system. The offer system reviews the information, identifies the offer code previously transmitted for auto-completion, marks the offer code as redeemed, and calculates the redemption rate of the transmitted offer code.

12 Claims, 6 Drawing Sheets

(56) References Cited

U.S. PATENT DOCUMENTS

| | | | |
|---|---|---|---|
| 2011/0106600 A1* | 5/2011 | Malik | G06Q 30/02 705/14.13 |
| 2012/0095819 A1* | 4/2012 | Li | G06Q 30/02 705/14.23 |
| 2012/0166268 A1* | 6/2012 | Griffiths | G06Q 30/0239 705/14.23 |
| 2013/0080235 A1* | 3/2013 | Wolfe | G06Q 30/0222 705/14.26 |
| 2013/0238423 A1* | 9/2013 | Pottjegort | G06Q 30/0246 705/14.45 |
| 2014/0095285 A1* | 4/2014 | Wadell | G06Q 30/00 705/14.25 |
| 2014/0114755 A1* | 4/2014 | Mezzacca | G06Q 30/0253 705/14.51 |

OTHER PUBLICATIONS

Karp, G. (Nov. 2, 2009). Let Browser Do the Shopping Add-Ons Make Comparisons and Forms Easy. South Florida Sun—Sentinel Retrieved from https://dialog.proquest.com/professional/docview/387584584?accountid=131444 (Year: 2009).*

* cited by examiner

200

210 Merchant system registers with offer system

220 User installs shopping cart module for offer system

230 User browses merchant system shopping website

240 User selects items from merchant system for checkout

245 User logged into offer system? — No → 247 User prompted to log in

Yes ↓

250 Offer system determines offer code(s)

260 Offer code module transmits offer code(s) to shopping basket module → 265 Offer code module marks offer code(s) as transmitted

270 Shopping basket module receives offer code(s)

275 Shopping basket module auto-completes offer code(s) on merchant system shopping basket webpage

280 User completes transaction with merchant system

290 Offer system determines redemption rate for offer code

310 Merchant system shopping basket webpage loads

320 Shopping basket module monitors for shopping basket webpage load event

330 Shopping basket module communicates load event information to offer code module

335 Offer code module receives load event information

340 Offer code module identifies merchant system based on the load event information

350 Offer code for merchant system? — No →

Yes ↓

355 Offer code module determines offer code(s) for merchant system

360 Offer code module identifies items in shopping basket

370 Offer code for items? — No →

Yes ↓

375 Offer code module determines offer code(s) for items in shopping basket

380 Multiple codes permitted?

Yes →

No ↓

390 Offer code module determines offer code providing greatest savings

REDEMPTION CODE AUTO-COMPLETE FOR ONLINE OFFERS AND TRACKING

TECHNICAL FIELD

The present disclosure relates generally to an offer redemption code system, and more particularly to methods and systems that allow for auto-detecting an electronic shopping basket and auto-completing offer redemption codes on the shopping basket webpage.

BACKGROUND

Merchants offer coupons or rebates as incentives for purchasing particular products. Traditionally, coupons are distributed in a paper format. A user redeems the coupon by taking the physical coupon to a merchant and purchasing a product that satisfies the terms of the coupon. Other forms of traditional coupons include rebates for purchasing particular products, wherein after purchasing a product that satisfies the terms of the rebate offer, the user fills out and returns required forms to request the rebate.

More recently, merchants have offered electronic offers. Such offers may be linked to merchant loyalty cards, wherein a user enrolls in a merchant's loyalty program and receives a loyalty card. A user then associates certain discounts to the loyalty card and redeems these discounts by presenting the loyalty card (or some form of identifying information, such as a telephone number) and the method of payment to the merchant when purchasing the discounted products.

With the advent of online marketplaces, users can copy/paste, click a link, or otherwise manually enter offer redemption codes when completing a transaction with an online merchant to receive a discount associated with the code. The user is required to search for codes that apply to the online merchant and/or the items in the user's electronic shopping basket.

SUMMARY

In certain example aspects described herein, a method for auto-completing offer redemption codes on a merchant system shopping basket webpage comprises and offer system that detects the electronic shopping basket, determines whether an offer code is applicable, and auto-completes the offer code in the field. When the user selects an item to add to the electronic shopping basket, the merchant system shopping basket webpage loads. The shopping cart module detects a load event and communicates information regarding the load event to the offer system. The offer system reviews the load event information, identifies the merchant system, and determines offer codes applicable to a purchase with the merchant system and/or the items in the electronic shopping basket.

The offer system communicates the offer code(s) to the shopping cart module, and the shopping cart module auto-completes the code(s) on the electronic shopping basket. The user completes the online transaction with the merchant system and the merchant system provides a notification of completed transaction webpage. The shopping cart module detects a load event for the completed transaction webpage and communicates information regarding the load event to the offer system. The offer system reviews the load event, identifies the offer code(s) previously transmitted for auto-completion by the shopping cart module, marks the offer code(s) as redeemed, and calculates the redemption rate of the transmitted offer code(s).

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 2 is a block flow diagram depicting a method for auto-completing offer redemption codes on a shopping basket webpage, in accordance with certain example embodiments.

FIG. 3 is a block flow diagram depicting a method determining applicable offer redemption codes, in accordance with certain example embodiments.

DETAILED DESCRIPTION OF THE EXAMPLE EMBODIMENTS

Overview

Figure 1:
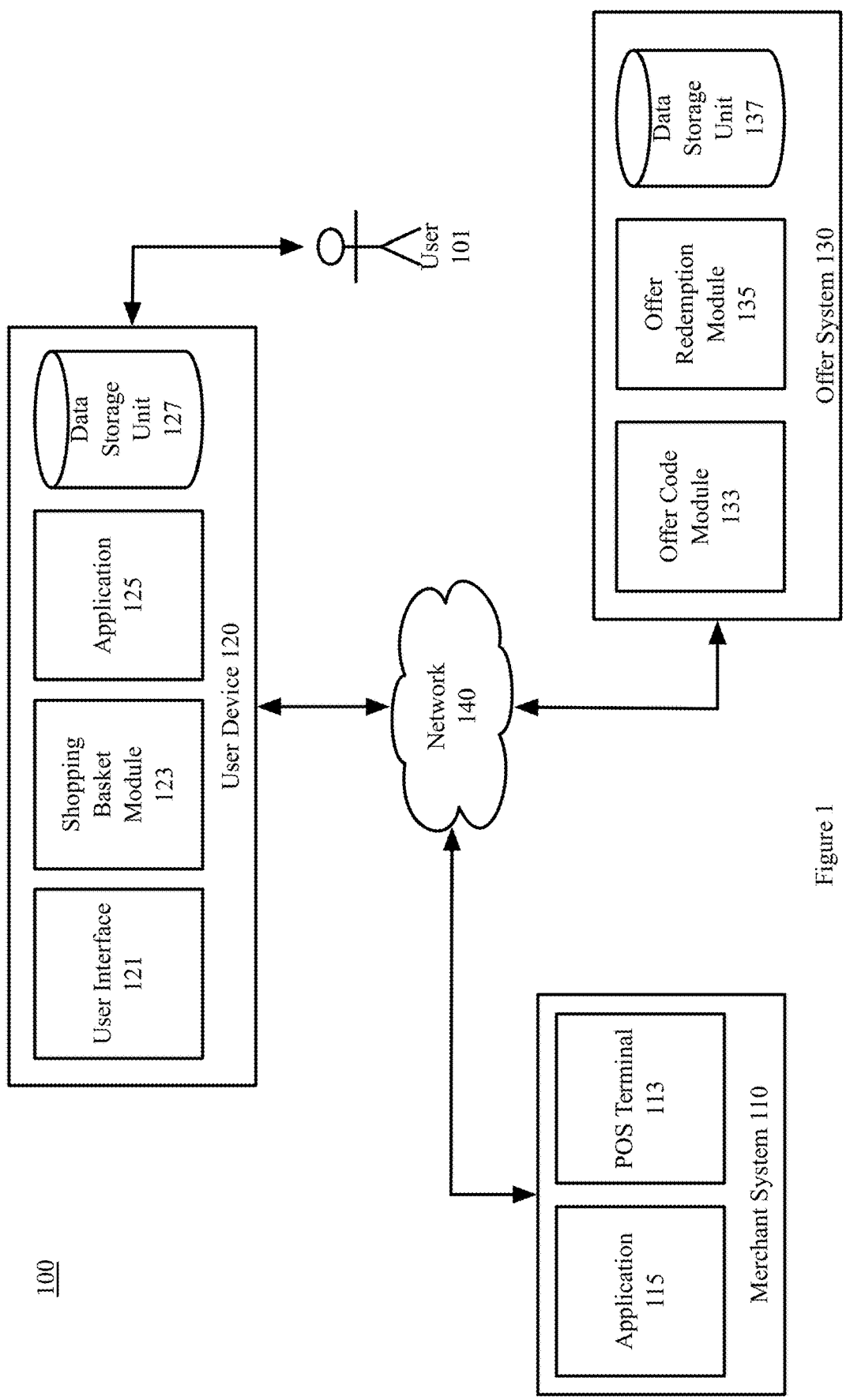
FIG. 1 is a block diagram depicting an offer redemption code system, in accordance with certain example embodiments.

The example embodiments described herein provide computer-implemented techniques for auto-completing offer redemption codes on a merchant system shopping basket webpage. In an example embodiment, a user has browsed, via a user device, items on a merchant system online marketplace and indicated a desire to place an item in an electronic "shopping basket." The electronic shopping basket comprises a field where the user may enter a code to redeem an electronic offer for the item and/or for the overall purchase with the merchant system. A browser plug-in installed on the user device detects the electronic shopping basket, determines whether an offer code is applicable, and auto-completes the offer code in the field. In some embodiments, the user must install the browser plug in and/or otherwise indicate that they would like to take advantage of the techniques described herein before the techniques will be provided to the user.

The merchant system registers with the offer system and provides data that allows an offer system shopping cart module to detect when a user has placed an item in a merchant system shopping basket, for example, a uniform resource locator ("URL") of the merchant system's shopping basket webpage. The merchant system also provides data that allows the offer system shopping cart module to detect when the user completes a transaction with the merchant system, for example, a URL indicating that the user is viewing the merchant system's notification of completed transaction webpage. In some embodiments, the user can place multiple items in an electronic shopping cart (or otherwise select multiple items for purchase) and only later view the shopping cart. The offer system may detect the placement of each item into the shopping cart and determine associated offers upon the detection of each. The offer system may also, or in the alternative, detect that the items are in the shopping cart (or otherwise selected for purchase) when the shopping cart is viewed (perhaps by detecting a URL that indicates that the user is viewing the shopping cart). In an alternative example embodiment, the offer system shopping cart module is capable of determining when the user has selected an item for purchase and/or completed the transaction without requiring the merchant system to register, for example, by detecting key words in the URL or key words on the merchant system webpage. The merchant system may provide offer codes to the offer system and redemption rules for the offer codes. In an alternative example embodiment, the offer system scans and gathers offer codes or obtains offer codes for products from the product manufacturer.

The user browses the merchant shopping website and selects an item to add to the electronic shopping basket. The merchant system shopping basket webpage loads. The shopping cart module detects a load event and communicates information regarding the load event to an offer code module. The offer code module reviews the load event information, identifies the merchant system, and determines offer codes applicable to a purchase with the merchant system. The offer code module may identify items in the electronic shopping basket and determine offer codes applicable to the items in the electronic shopping basket. In an alternative example embodiment, the offer code module reviews the redemption terms of the offer codes and provides recommendations for offer codes that may be applicable if the user changes the items in the electronic shopping basket or includes additional items in the electronic shopping basket. If the merchant system does not permit redemption of more than one offer code, the offer code module determines the offer code that provides the greatest savings.

The offer code module communicates the offer code(s) to the shopping cart module, and the shopping cart module auto-completes the code(s) on the merchant system shopping basket. The user completes the online transaction with the merchant system. Upon completing the checkout process, the merchant system provides a notification of completed transaction webpage. The shopping cart module detects a load event for the completed transaction webpage and communicates information regarding the load event to an offer redemption module. The offer redemption module reviews the load event, identifies the offer code(s) previously transmitted for auto-completion by the shopping cart module, marks the offer code(s) as redeemed, and calculates the redemption rate of the transmitted offer code(s).

The inventive functionality of the invention will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

FIG. 1 is a block diagram depicting an offer redemption code system, in accordance with certain example embodiments. As depicted in FIG. 1, the exemplary operating environment 100 includes a merchant system 110, a user device 120, and an offer system 130 that are configured to communicate with one another via one or more networks 140. In an alternative example embodiment, two or more of these systems, or the components thereof, (including systems 110, 120, and 130) are integrated into the same system Each network 140 includes a wired or wireless telecommunication means by which network systems (including systems 110, 120, and 130) can communicate and exchange data. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network system (including systems 110, 120, and 130) includes a device having a communication module capable of transmitting and receiving data over the network 140. For example, each network system (including systems 110, 120, and 130) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 140. In the example embodiment depicted in FIG. 1, the network systems (including systems 110, 120, and 130) are operated by merchants (not shown), users 101 or consumers, and an offer system operator (not shown), respectively.

The merchant system 110 comprises at least one point of sale ("POS") terminal 113 that is capable of processing a purchase transaction initiated by a user 101. In an example embodiment, the merchant operates an online store and the user 101 indicates a desire to make a purchase by clicking a link or "checkout" button on a website. In an alternative example embodiment, the user device 120 is configured to perform the functions of the POS terminal 113. In this example, the user 101 scans and/or pays for the transaction via the user device 120 without interacting with the POS terminal 113. In an example embodiment, the user presents a form of payment and a loyalty program identification (for example, a loyalty program card, phone number, loyalty program number, biometric identification, or some other form of identifying information) when the transaction is processed. In an alternative example embodiment, the user presents a merchant system 110 account identifier when the transaction is processed.

In an example embodiment, the merchant system 110 is capable of communicating with the user device 120 via an application 115. The application 115 may be an integrated part of the POS terminal 113 or a standalone hardware device (not shown), in accordance with alternative example embodiments.

In an example embodiment, the user device 120 may be a personal computer, mobile device (for example, notebook, computer, tablet computer, netbook computer, personal digital assistant ("PDA"), video game device, GPS locator device, cellular telephone, Smartphone or other mobile device), television, or other appropriate technology that includes or is coupled to a web server, or other suitable application for interacting with web page files. The user 101 can use the user device 120 to access a merchant system online marketplace or webpage, browse items on the marketplace, and indicated a desire to place an item in an electronic "shopping basket" via a user interface 121 and an application 125. The application 125 is a program, function, routine, applet or similar entity that exists on and performs its operations on the user device 120. For example, the application 125 may be one or more of a shopping application, merchant system 110 application, an Internet browser, a digital wallet application, a loyalty card application, another value-added application, a user interface 121 application, or other suitable application operating on the user device 120.

In an example embodiment, the data storage unit 127 and application 125 may be implemented in a secure element or other secure memory (not shown) on the user device 120. In an alternative example embodiment, the data storage unit 127 may be a separate memory unit resident on the user device 120. An example data storage unit 127 enables storage of user contact details for retrieval of a user offer system 130 account. In an example embodiment, the data storage unit 127 can include any local or remote data storage structure accessible to the user device 120 suitable for storing information. In an example embodiment, the data storage unit 127 stores encrypted information, such as HTML5 local storage.

An example user device 120 comprises a shopping basket module 123. An example shopping basket module 123 is a browser plug-in corresponding to the offer system 130. The shopping basket module 123 may be an integrated part of the application 125, an integrated part of the offer system 130, or a standalone hardware device (not shown), in accordance with alternative example embodiments. The user 101 installs the shopping basket module 123 on the user device 120 to facilitate the auto-detection of the merchant system's 110 shopping basket webpage, communicate load event information to the offer system, auto-complete offer redemption codes communicated by the offer system 130, and auto-detect the merchant system's 110 notification of completed transaction webpage. In an example embodiment, the application 125 communicates with the shopping basket module 123. For example, the application 125 provides data to the shopping basket module 123 to allow for the detection of specific load events, such as the loading of the merchant system's 110 shopping basket webpage and notification of completed transaction webpage. In an example embodiment, the shopping basket module 123 comprises application programming interfaces ("APIs") that allow the module 123 to interact and communicate with the application 125.

An example shopping basket module 123 communicates with the offer system 130. For example, the shopping basket module 123 transmits load event information to the offer system 130 when the merchant system 110 shopping basket is detected. An example offer system 130 comprises an offer code module 133, an offer redemption module 135, and a data storage unit 137. The offer code module 133 receives the load event information for the merchant system 110 shopping basket from the shopping basket module 123 and retrieves applicable offer redemption codes. An example offer code module 133 receives offer redemption codes from merchant systems 110. In an alternative example embodiment, the offer code module 133 scans the Internet and retrieves offer redemption codes. In another alternative example embodiment, the offer code module 133 obtains offer redemption codes from users 101 and applications 125. The offer redemption codes are saved in the data storage unit 137.

In an example embodiment, the data storage unit 137 can include any local or remote data storage structure accessible to the offer system 130 suitable for storing information. In an example embodiment, the data storage unit 137 stores encrypted information, such as HTML5 local storage.

An example shopping basket module 123 receives the offer redemption codes transmitted by the offer code module 133 and auto-completes the codes on the merchant system 110 shopping basket webpage. An example shopping basket module 123 also communicates with the offer redemption module 135. For example, the shopping basket module 123 transmits load event information to the offer system 130 when the merchant system's 110 notification of completed transaction is detected. The offer redemption module 135 receives the load event information, determines which offer redemption codes were redeemed during the transaction, and determines a rate of redemption for the offer redemption codes.

Figure 5:
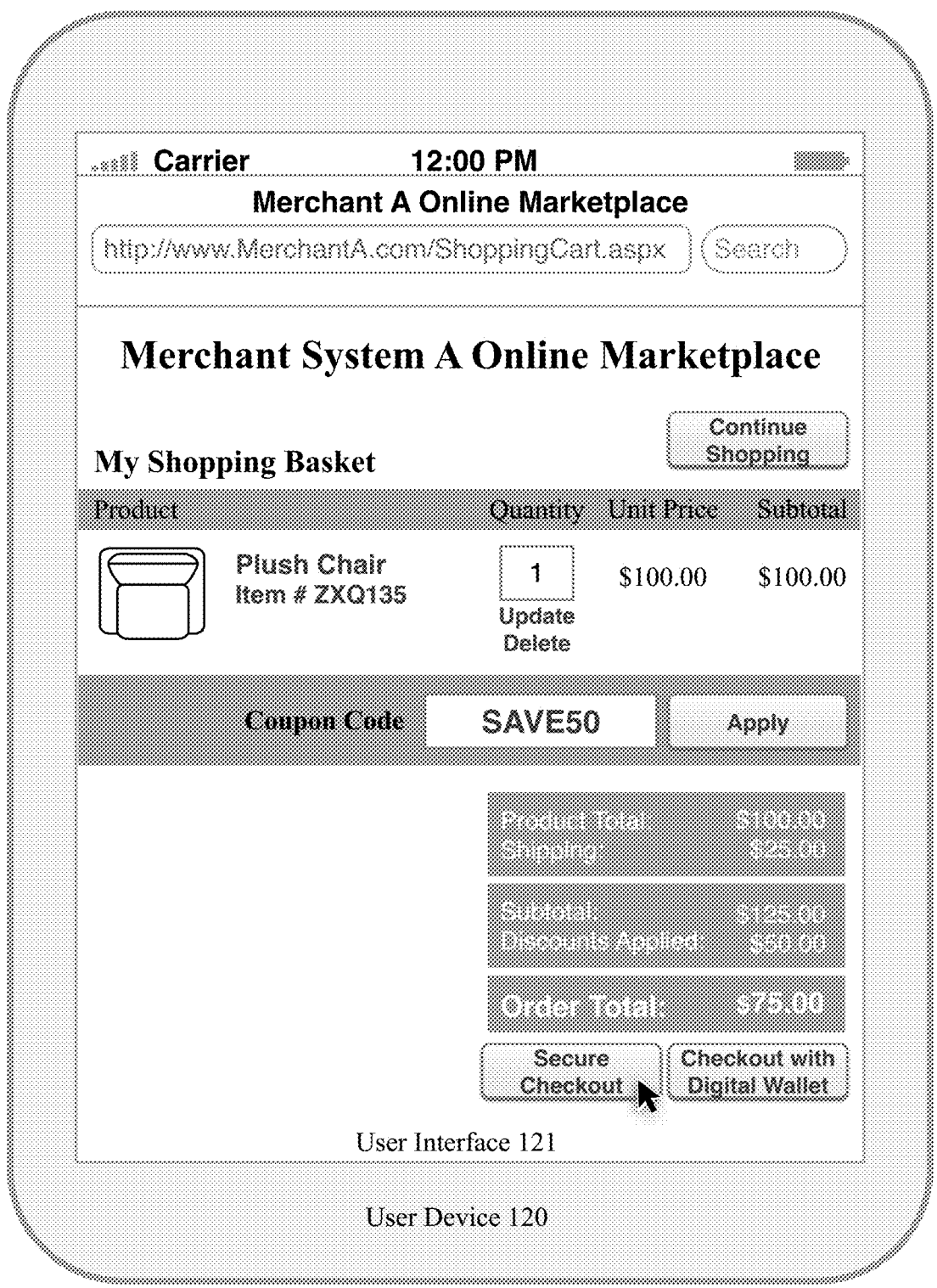
FIG. 5 is a block diagram depicting a user interface displaying an offer redemption code system, in accordance with certain example embodiments.

FIG. 5 is a block diagram depicting an example user interface 121 displaying an offer redemption code system, in accordance with certain example embodiments. As depicted in FIG. 5, the exemplary operating environment 500 includes a user device 120 and a user interface 121. Once the user 101 selects an item to be placed in the electronic shopping basket, the shopping basket module 123 detects the electronic shopping basket and auto-completes the offer redemption code. As depicted in FIG. 5, the user interface 121 displays the auto-completed offer redemption code in the electronic shopping basket.

The components of the example operating environment 100 and 500 are described hereinafter with reference to the example methods illustrated in FIGS. 2-4.

Example System Processes

FIG. 2 is a block flow diagram depicting a method for auto-completing offer redemption codes on a shopping basket webpage, in accordance with certain example embodiments. The method 200 is described with reference to the components illustrated in FIG. 1.

In block 210, the merchant system 110 registers with the offer system 130. In an example embodiment, the merchant system 110 provides the URL of the system's shopping basket webpage and the system's notification of completed transaction webpage. In an alternative example embodiment, the merchant system 110 also provides offer redemption codes when registering or at any time thereafter. In another alternative example embodiment, the merchant system provides a field name for an offer redemption code field on the system's shopping basket webpage. In an example embodiment, the offer system 130 communicates the merchant system's 110 registration information, or a portion thereof, to the shopping basket module 123.

In an alternative example embodiment, the merchant system 110 is not required to register with the offer system 130. In this embodiment, the shopping basket module 123 reviews load events to determine when the merchant system's 110 shopping basket webpage loads. For example, the shopping basket module 123 scans for key words in the URL when a webpage is loaded, such as "checkout," "basket," "cart," or other words or phrases indicating an item has been added to an electronic shopping basket. In an alternative example, the shopping basket module 123 scans for form fields when the webpage is loaded, such as those where redemption codes may be entered.

In block 220, the user 101 installs the shopping cart module 123 on the user device 120. In an example embodiment, the user 101 may install the shopping cart module 123 at any time prior to the selection of an item to be placed in the user's 101 electronic shopping basket or the user 101 indicating a desire to check out. In an alternative example embodiment, the shopping cart module 123 is component of an application 125 installed on the user device 120.

In an example embodiment, the user 101 is prompted to provide offer system 130 account information when the shopping cart module 123 is installed. If the user 101 does not have an offer system 130 account the user 101 is prompted to create an offer system 130 account. In an example embodiment, the user 101 may create the offer system 130 account at any time prior to accessing the shopping cart module 123. In an example embodiment, the user 101 accesses the offer system 130 via a website and a network 140. In an example embodiment, the user 101 submits registration information to the offer system 130, including, but not limited to, name, address, phone number, e-mail address, and information for one or more registered financial accounts, including bank account debit cards, credit cards, a loyalty rewards account card, or other type of account that can be used to make a purchase (for example, card type, card number, expiration date, security code, and billing address). In an example embodiment, the user's 101 offer system 130 account information is saved in the data storage unit 137 and is accessible to the offer code module 133 and offer redemption module 135. In an example embodiment, the offer system 130 account is a digital wallet account maintained by the offer system 130 or a third party system. In an alternative example embodiment, the user 101 may use a smart phone application to register with the offer system 130. In yet another alternative example embodiment, the user 101 accesses the offer system 130 via a smart phone application 125.

In block 230 the user 101 browses the merchant system 110 online marketplace. In an example embodiment, the merchant system 110 online marketplace is an online shopping website wherein the user 101 can select and purchase items from the merchant system 110.

In block 240, the user 101 selects an item from the merchant system 110. In an example embodiment, the user 101 indicates a desire to place the item in an electronic shopping basket. In an alternative example embodiment, the user 101 has previously selected one or more items to be placed in the electronic shopping basket and has selected an additional item to be placed in the electronic shopping basket. In another alternative example embodiment, the user 101 has previously selected one or more items to be placed in the electronic shopping basket and has indicated a desire to complete the purchase by clicking a "checkout" button in the electronic shopping basket.

In block 245, the shopping cart module 123 determines whether the user 101 is logged into the offer system 130. In an example embodiment, the user 101 has previously logged into, or is otherwise automatically logged into the offer system 130. In an alternative example embodiment, the user's 101 login credentials are shared across other accounts (for example, social networking websites and user device 120 accounts) and the user 101 is automatically logged into the offer system 130 account using the shared login credentials.

If the user 101 is not logged into the offer system 130, the method 200 proceeds to block 247. In block 247 the user 101 is prompted to log into the offer system 130.

Returning to block 245, if the user 101 is logged into the offer system 130, the method 200 proceeds to block 250. In block 250, the offer system 130 determines which offer redemption codes are applicable to the electronic shopping basket. In an example embodiment, applicability of the offer redemption codes is determined by the items in the electronic shopping basket or by the identity of the merchant system 130. In an alternative example embodiment, additional rules and conditions apply, such as a total amount of the electronic shopping basket, a subtotal of particular items within the electronic shopping basket, an identity of the user 101, and a financial account used to pay for the items in the electronic shopping basket. The method for determining applicable offer codes is described in more detail hereinafter with reference to the methods described in FIG. 3.

FIG. 3 is a block flow diagram depicting a method determining applicable offer redemption codes, in accordance with certain example embodiments, as referenced in block 250. The method 250 is described with reference to the components illustrated in FIG. 1.

In block 310, the merchant system 110 shopping basket webpage loads. In an example embodiment, the merchant system 110 shopping basket webpage comprises one or more items the user 101 has selected to purchase. In an alternative example embodiment, the merchant system 110 shopping basket webpage is displayed after the user 101 has indicated a desire to checkout or otherwise complete the purchase of the selected items.

In an example embodiment, the merchant system 110 shopping basket webpage comprises a form field that allows entry of one or more offer redemption codes. An example offer redemption code comprises a text code, numeric code, or some combination thereof, that when entered provides for the redemption of an offer. For example, the offer redemption code "25OFF" may provide a 25% discount on the total price of the shopping basket or $25 off the total price and "FREESHIP" may provide free shipping for the items in the shopping basket when purchased.

In block 320, the shopping basket module 123 monitors for a shopping basket load event. In an example embodiment, the shopping basket module 123 receives an indication whenever a webpage is loaded in a browser on the user device 120. In an alternative example embodiment, the shopping basket module 123 continuously monitors or periodically monitors the browser for key words in the URL to determine when a shopping basket load event.

In block 330, the shopping basket module 123 communicates the load event information to the offer system 130. In an example embodiment, load event information is communicated to the offer code module 133 resident on the offer system 130. In an example embodiment, the load event information comprises one or more of an identity of the merchant system 110, an identity of the user 101, a description of the items in the electronic shopping basket, a total price of the items in the electronic shopping basket, and a price associated with the items in the electronic shopping basket. In an alternative example embodiment, the shopping cart module 123 communicates these details in response to a request by the offer system 130 or in multiple communications to the offer system 130.

In block 335, the offer code module 133 receives the load event information.

In block 340, the offer code module 133 identifies the merchant system 110 based on the load event information received from the shopping basket module 123. In an example embodiment, the merchant system 110 has previously registered with the offer system 130 in block 210 and the offer system 130 can identify the merchant system 110 from the URL of the shopping basket webpage. In an alternative example embodiment, the merchant system 110 is not registered with the offer system 130 and that merchant system 110 is identified by keywords in the URL of the shopping basket webpage. For example, "merchantsystemA/shoppingbasket/" would identify Merchant System A. In an alternative example embodiment, the merchant system 110 is identified from prior load events captured by the shopping basket module 123. For example, the shopping basket module 123 may capture the load event for the merchant system's 110 main shopping page and then a load event for the electronic shopping basket. The shopping basket module 123 may transmit the merchant system 110 identification information captured from the main shopping page with the load event information for the electronic shopping basket. In an alternative example embodiment, the shopping basket module 123 may use smart logic to otherwise determine the identity of the merchant system 110 and transmit the identity with the load event information.

In block 350, the offer code module 133 determines if offer redemption codes are applicable to the merchant system 110, as identified in block 340. In an example embodiment, the offer code module 133 cross-references the identity of the merchant system 110 determined in block 340 with the offer redemption codes saved in the data storage unit 137. In an example embodiment, one or more of the offer redemption codes is applicable to a transaction with a specific merchant system 110, as defined by the terms and conditions of the offer redemption code. The offer code module 133 reviews the terms and conditions of the offer redemption codes and determines whether the codes are applicable to a transaction with the merchant system 110.

If the offer code module 133 identifies offer redemption codes applicable to a transaction with the merchant system 110, the method 250 proceeds to block 355 in FIG. 3.

In block 355, the offer code module 133 determines which of the offer redemption codes applicable to a transaction with the merchant system 110 can be applied. In an example embodiment, each offer redemption codes will have one or more structured rules or conditions that the offer system 130 can understand without human intervention. These rules include, but are not limited to, a purchase threshold (for example, receive $10 back on a single purchase of more than $50 from the merchant system 110), a minimum number of purchases from the merchant (for example, receive $10 back on your tenth purchase from the merchant system 110), a time restriction (for example, receive $10 back for a purchase on Wednesday), a product or category restriction (for example, receive $10 back when you purchase a specific product or a product from a specific department), an expiration date, a product limitation, a user 101 limitation, and a limited number of redemptions. In an example embodiment, these rules are set by merchant system 110 at the time the redemption offer is created and reviewed by the offer system 130 before the offer redemption is applied.

In an example embodiment, the offer code module 133 reviews the terms of the offer redemption code and the load event information to determine which of the offer redemption codes are applicable to the electronic shopping basket.

In an alternative example embodiment, the offer code module 133 reviews the redemption terms of the offer codes and provides recommendations for offer redemption codes that may be applicable if the user changes the items in the electronic shopping basket or includes additional items in the electronic shopping basket.

From block 355 in FIG. 3, the method 250 proceeds to block 360 in FIG. 3.

Returning to block 350 in FIG. 3, if the offer code module 133 does not identify offer redemption codes applicable to a transaction with the merchant system 110, the method 250 proceeds to block 360 in FIG. 3.

In block 360, the offer code module 133 identifies items in the electronic shopping basket. In an example embodiment, the offer code module 133 identifies items in the electronic shopping basket from the load event information transmitted by the shopping basket module 123. In an alternative example embodiment, the shopping basket module 123 may capture the load event for a particular item on the merchant system's 110 online marketplace and then a load event for the electronic shopping basket. The shopping basket module 123 may transmit the product identification information captured from the item page on the online marketplace page with the load event information for the electronic shopping basket. In an alternative example embodiment, the shopping basket module 123 reviews the user's 101 browser history or the load events for items viewed by the user 101 and transmit information regarding the items browsed with the load event information. The offer code module 133 may then determine and identity of items based on the browser history. In an alternative example embodiment, the shopping basket module 123 may use smart logic to otherwise determine the identity of the items and transmit the identity with the load event information.

In block 370, the offer code module 133 determines if offer redemption codes are applicable to the items identified in the electronic shopping cart, as identified in block 360. In an example embodiment, the offer code module 133 cross-references the identity of the items determined in block 360 with the offer redemption codes saved in the data storage unit 137. In an example embodiment, one or more of the offer redemption codes is applicable to a specific item, as defined by the terms and conditions of the offer redemption code. The offer code module 133 reviews the terms and conditions of the offer redemption codes and determines whether the codes are applicable to an item in the electronic shopping basket.

If the offer code module 133 identifies offer redemption codes applicable to one or more items in the electronic shopping basket, the method 250 proceeds to block 375 in FIG. 3.

In block 375, the offer code module 133 determines which of the offer redemption codes applicable to the items in the electronic shopping basket can be. In an example embodiment, each offer redemption codes will have one or more structured rules or conditions that the offer system 130 can understand without human intervention. These rules include, but are not limited to, a purchase threshold (for example, receive $10 back on a single purchase of more than $50 from the merchant system 110), a minimum number of purchases from the merchant (for example, receive $10 back on your tenth purchase from the merchant system 110), a time restriction (for example, receive $10 back for a purchase on Wednesday), a product or category restriction (for example, receive $10 back when you purchase a specific product or a product from a specific department), an expiration date, a product limitation, a user 101 limitation, and a limited number of redemptions. In an example embodiment, these rules are set by merchant system 110 at the time the redemption offer is created and reviewed by the offer system 130 before the offer redemption is applied. In an alternative example embodiment, these rules are set by a product manufacturer or other third party system.

In an example embodiment, the offer code module 133 reviews the terms of the offer redemption code and the load event information to determine which of the offer redemption codes are applicable to the electronic shopping basket.

In an alternative example embodiment, the offer code module 133 reviews the redemption terms of the offer codes and provides recommendations for offer redemption codes that may be applicable if the user changes the items in the electronic shopping basket or includes additional items in the electronic shopping basket.

Returning to block 370 in FIG. 3, if the offer code module 133 does not identify offer redemption codes applicable to the items in the electronic shopping basket, the method 250 proceeds to block 260 in FIG. 2.

Returning to block 375 in FIG. 3, the method 250 proceeds to block 380 in FIG. 3. In block 380, the offer code module 133 determines whether the merchant system 110 electronic shopping basket permits multiple offer redemption codes. In an example embodiment, the merchant system 110 previously registered with the offer system 130 and provided form field information that allows the offer system to determine the number of offer redemption codes accepted by the merchant system 110. In an alternative example embodiment, the shopping basket module 123 determines the number of offer redemption codes permitted.

If multiple offer redemption codes are not permitted, the method 250 proceeds to block 390 in FIG. 3. In block 390, the offer code module 133 determines which offer redemption code provide the greatest savings for the user 101. In an example embodiment, the offer code module 133 ranks the offer redemption codes in order of the greatest savings provided to the user 101. In this embodiment, the offer code module 133 transmits only the offer redemption code providing the greatest savings to the shopping basket module 123. In an alternative example embodiment, the offer code module 133 transmits more than one offer redemption code to the shopping basket module 123 and identifies the amount of savings provided to the user 101 or otherwise ranks the offer redemption codes in an order of savings provided.

From block 390 in FIG. 3, the method 250 proceeds to block 260 in FIG. 2.

Returning to block 380 in FIG. 3, if multiple offer redemption codes are permitted, the method 250 proceeds to block 260 in FIG. 2.

Returning to FIG. 2, in block 260, the offer code module 133 transmits the offer redemption code(s) to the shopping basket module 123. In an example embodiment, the offer code module 133 transmits the offer redemption code that provides the greatest savings to the user 101. In an alternative example embodiment, the offer code module 133 transmits multiple offer redemption codes and provides an indication of the best savings for the user 101. In another alternative example embodiment, the shopping basket module 123 determines which offer redemption code provides the greatest savings to the user 101.

In block 256, the offer code module 133 makes the offer redemption codes communicated to the shopping basket module as transmitted. In an example embodiment, the offer code module 133 saves the transmitted offer redemption codes in the user account maintained by the offer system.

In block 270, the shopping basket module 123 receives the offer redemption code(s).

In block 275, the shopping basket module 123 auto-completes the offer redemption code(s) on the merchant system 110 shopping basket webpage. In an example embodiment, the shopping basket module 123 determines the form field where offer redemption codes may be entered and auto-fills the code in the form field. In an alternative example embodiment, the merchant system 110 has previously registered with the offer system 130 and provided the form field information. In this embodiment, the offer system 130 provides a map of the form field information to the shopping basket module 123.

In block 280, the user 101 completes the transaction with the merchant system 110. In an example embodiment, the user 101 provides financial account information to the merchant system 110 to pay for the transaction. In an alternative example embodiment, the user 101 uses a digital wallet or third party system to complete the financial transaction. In an example embodiment, the user 101 account maintained by the offer system 130 comprises a digital wallet and the financial information required to complete the transaction is transmitted to the shopping basket module 123 in block 260 and auto-completed by the shopping basket module 123 in block 275.

In block 290, the offer system 130 determines the redemption rate for the offer redemption codes transmitted. In an example embodiment, the merchant system 110 provides notification that the transaction was completed. In an example embodiment, the notification comprises a notification of completed transaction webpage. The shopping basket module 123 detects the load event for the notification of completed transaction webpage and communicates the load event information to the offer system 130. The method for determining the redemption rate for the offer redemption codes is described in more detail hereinafter with reference to the methods described in FIG. 4.

Figure 4:
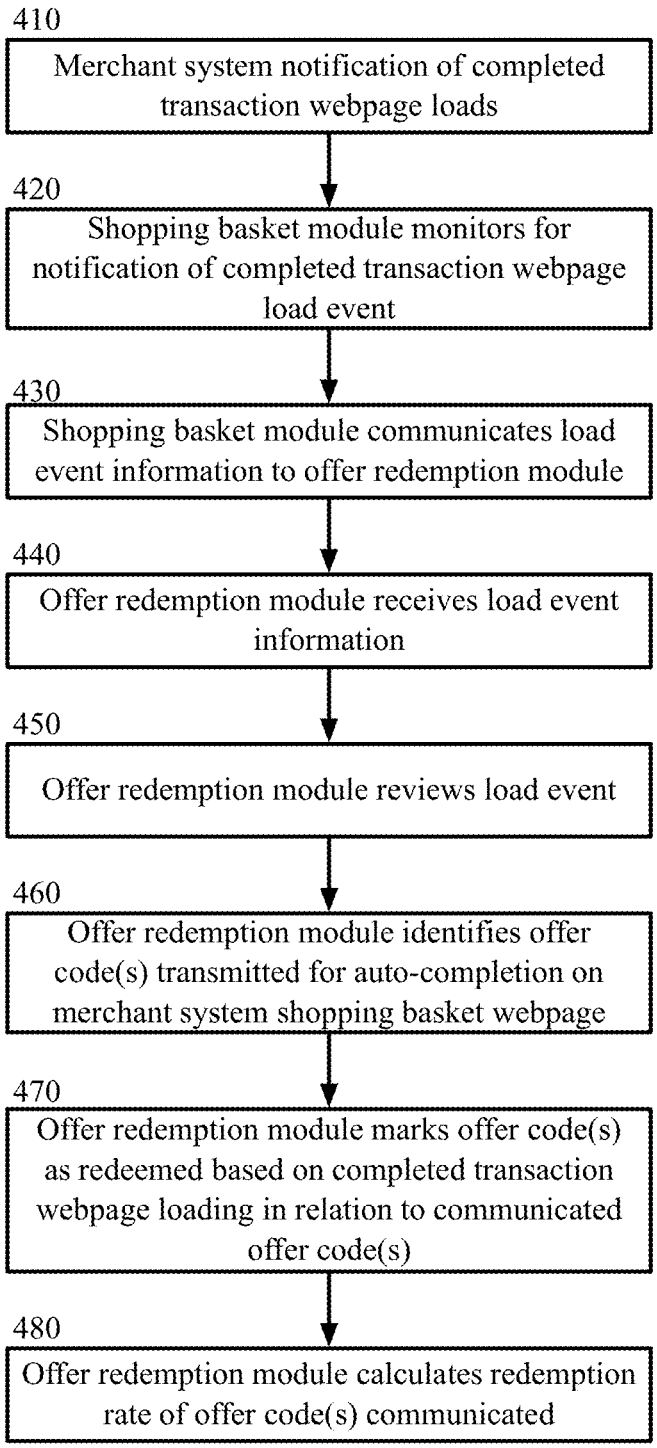
FIG. 4 is a block flow diagram depicting a method for determining a redemption rate for the offer redemption codes, in accordance with certain example embodiments.

FIG. 4 is a block flow diagram depicting a method for determining the redemption rate for the offer redemption codes, in accordance with certain example embodiments, as referenced in block 290. The method 290 is described with reference to the components illustrated in FIG. 1.

In block 410, the merchant system 110 notification of completed transaction webpage loads. In an example embodiment, the notification of a completed transaction webpage comprises an indication that the user 101 has completed the transaction with the merchant system 110.

In block 420, the shopping basket module 123 monitors for a notification of completed transaction load event. In an example embodiment, the shopping basket module 123 receives an indication whenever a webpage is loaded in a browser on the user device 120. In an alternative example embodiment, the shopping basket module 123 continuously monitors or periodically monitors the browser for key words in the URL to determine a notification of completed transaction load event. In an alternative example embodiment, the shopping basket module 123 monitors the load events after auto-completing the offer redemption codes on the electronic shopping basket.

In block 430, the shopping basket module 123 communicates the load event information to the offer system 130. In an example embodiment, load event information is communicated to the offer redemption module 133 resident on the offer system 130. In an example embodiment, the load event information comprises one or more of an identity of the merchant system 110, an identity of the user 101, and an identity of the offer redemption codes auto-completed on the electronic shopping basket. In an alternative example embodiment, the shopping cart module 123 communicates these details in response to a request by the offer system 130 or in multiple communications to the offer system 130.

In block 440, the offer redemption module 135 receives the load event information.

In block 450, the offer redemption module 135 reviews the load event information.

In block 460, the offer redemption module 135 identifies the offer redemption codes transmitted for auto-completion on the merchant system 110 shopping basket webpage. In an example embodiment, the offer redemption module 135 identifies the user 101 account from the information communicated by the shopping basket module 123 in block 430 and retrieves the offer redemption codes saved in the user's 101 offer system account. In an alternative example embodiment, the offer redemption system 135 identifies the merchant system 110 from the load event information and determines which offer redemption codes correspond to the merchant system 110.

In block 470, the offer redemption module 135 marks the offer redemption codes as redeemed. In an example embodiment, offer redemption module 135 determines that the offer redemption codes previously transmitted were redeemed based on the notification of completed transaction load event. In an example embodiment, the offer redemption module 135 maintains a record of the total number of times each offer redemption code has been transmitted and redeemed.

In block 480, the offer redemption module 135 calculates the redemption rate of the offer redemption codes communicated to the shopping basket module 123 in block 260 in FIG. 2. In an example embodiment, the redemption rate comprises a percentage of the number of time the offer redemption code has been transmitted for auto-completion compared to the number of times the offer redemption code has been redeemed.

In an example embodiment, the offer system 130 can provide the merchant system 110 with reports indicating the redemption rate of offer redemption codes submitted by the merchant system 110.

OTHER EXAMPLE EMBODIMENTS

Figure 6:
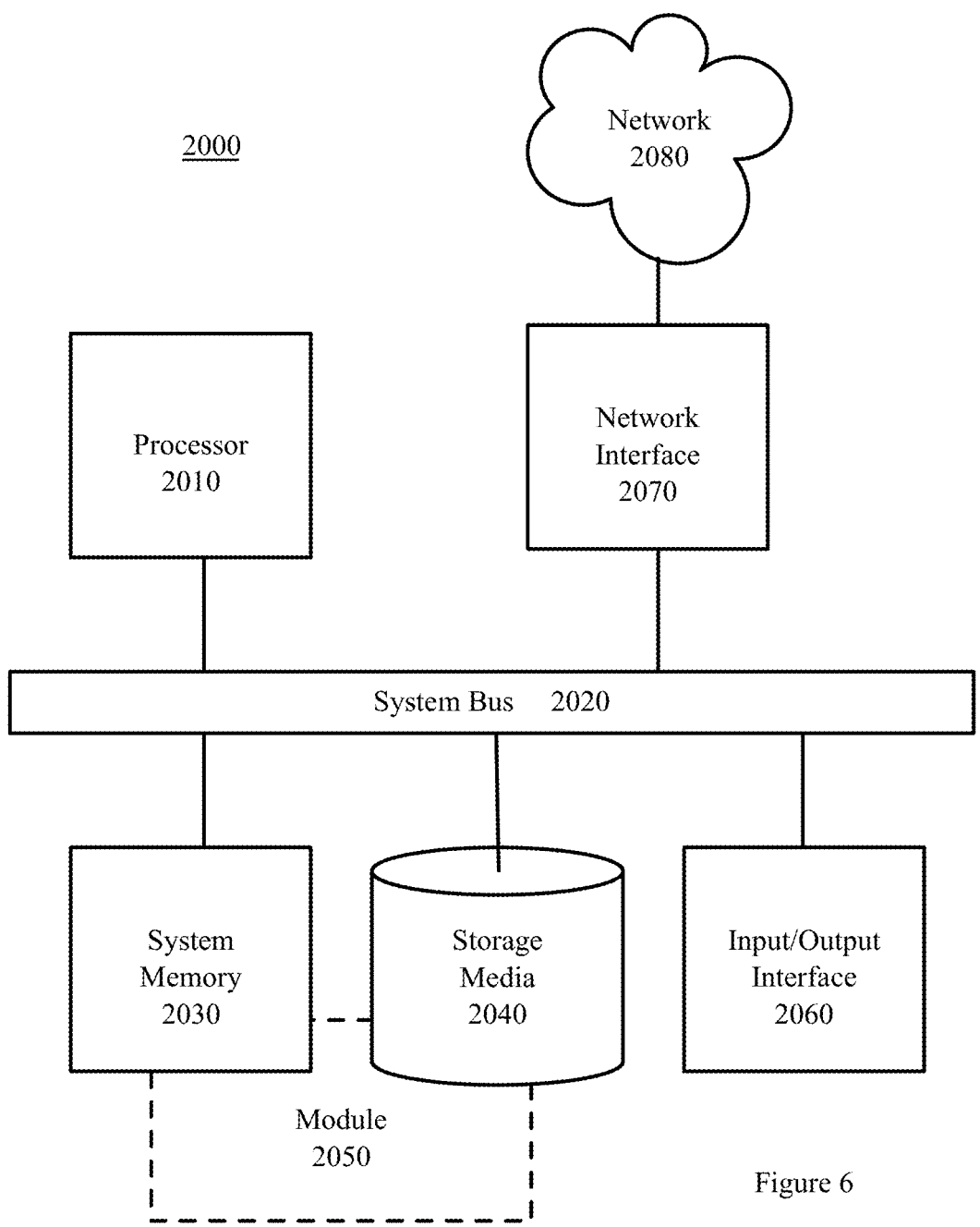
FIG. 6 is a block diagram depicting a computer machine and module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a Smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to auto-complete form fields in electronic shopping baskets for online marketplaces with offer redemption codes, comprising, by an offer computing system:

receiving, from a user computing device, information regarding a first load event detected by the user computing device in association with an electronic shopping basket and an online marketplace;

identifying a merchant system associated with the online marketplace based at least in part on the information regarding the first load event in association with the electronic shopping basket and the online marketplace;

determining that a user has placed an item in the electronic shopping basket for the online marketplace for a purchase transaction between the user and the online marketplace by periodically detecting key words in a first URL identified by the information regarding the first load event for the electronic shopping basket, the electronic shopping basket comprising a form field for one or more offer redemption codes;

in response to determining that the user has placed the item in the electronic shopping basket for the online marketplace, identifying one or more offer redemption codes that correspond to the first URL and the merchant system, the one or more offer redemption codes comprising redemption conditions that are satisfied by the purchase transaction;

selecting one of the one or more offer redemption codes determined to provide the user with greatest savings to apply to the purchase transaction;

providing the selected offer redemption code from the offer computing system to the user computing system for auto-completing the form field with the selected offer redemption code and applying the offer redemption code from the autocompleted form field to the purchase transaction to complete the purchase transaction with the online marketplace;

receiving, by the offer computing system from the user computing device, information regarding a second load event detected by the user computing device in association with the electronic shopping basket and the online marketplace;

identifying, from the information regarding the second load event, the selected offer redemption code and a second URL indicating that the user has completed the purchase transaction; and marking the applied offer redemption code as redeemed in response to detecting that the user has completed the purchase transaction with the online marketplace.

2. The method of claim 1, further comprising saving one or more redemption codes to an account of the user managed by the offer computing system.

3. The method of claim 2, wherein identifying the one or more offer redemption codes that correspond to the first URL comprises reviewing the redemption codes saved to the account of the user managed by the offer computing system to identify one or more offer redemption codes that correspond to an identity of the online marketplace or the item placed in the electronic shopping basket.

4. The method of claim 1, wherein the redemption conditions comprise a number of times the one or more redemption codes can be redeemed.

5. The method of claim 1, further comprising reviewing a browser history for the user, wherein the one or more offer redemption codes comprise offer redemption codes corresponding to an item from the browser history of the user and an identity of the online marketplace.

6. The method of claim 1, further comprising calculating, by the offer computing system, a redemption rate of the applied offer redemption code based at least in part on marking the applied offer redemption code auto-completed in the form field in the electronic shopping basket for the online marketplace as redeemed.

7. The method of claim 6, wherein calculating the redemption rate of the applied offer redemption code comprises comparing a number of times the applied offer redemption code was auto-completed to a number of times the offer redemption code was redeemed.

8. A non-transitory computer-readable medium having computer-executable program instructions embodied therein that when executed by an offer computing system cause the offer computing system to auto-complete form fields in an electronic shopping basket for an online marketplace with an offer redemption code that provides a user with the greatest savings, the computer-executable program instructions comprising instructions to:

receive, from a user computing device, information regarding a first load event detected by the user computing device in association with an electronic shopping basket and an online marketplace;

identify a merchant system associated with the online marketplace based at least in part on the information regarding the first load event in association with the electronic shopping basket and the online marketplace;

determine that a user has placed an item in the electronic shopping basket for the online marketplace for a purchase transaction between the user and the online marketplace by periodically detecting key words in a first URL for the electronic shopping basket, the electronic shopping basket comprising a form field for one or more offer redemption codes;

identify one or more offer redemption codes that correspond to the first URL and the merchant system;

select one of the one or more offer redemption codes that provides the user with greatest savings to apply to the purchase transaction;

provide the selected offer redemption code to the user computing device for auto-completing the form field with the selected offer redemption code and applying the offer redemption code from the autocompleted form field to complete the purchase transaction with the online marketplace;

receive, from the user computing device, information regarding a second load event detected by the user computing device in association with the electronic shopping basket and the online marketplace;

identify, from the information regarding the second load event, the selected offer redemption code and that the user has completed the purchase transaction with the online marketplace; and mark the applied offer redemption code field as redeemed in response to detecting that the user has completed the purchase transaction.

9. The non-transitory computer-readable medium of claim 8, wherein determining that the user has completed the purchase transaction with the online marketplace comprises detecting a second URL for a transaction completed document.

10. The non-transitory computer-readable medium of claim 8, further comprising computer-executable program instructions to review a browser history for the user, wherein the one or more offer redemption codes comprise offer redemption codes corresponding to an item from the browser history of the user and an identity of the online marketplace.

11. A system to auto-complete form fields in electronic shopping baskets for online marketplaces with offer redemption codes that provides users with the greatest savings, comprising:

a storage medium; and a processor communicatively coupled to the storage medium, wherein the processor executes application code instructions that are stored in the storage medium to cause the system to:

receive, from a user computing device, information regarding a first load event detected by a user computing device in association with an electronic shopping basket and an online marketplace;

identify a merchant system associated with the online marketplace based at least in part on the information regarding the first load event in association with the electronic shopping basket and the online marketplace;

determine that a user has placed an item in the electronic shopping basket for the online marketplace for a purchase transaction between the user and the online marketplace by periodically detecting key words in a first URL for the electronic shopping basket, the electronic shopping basket comprising a form field for one or more offer redemption codes;

in response to determining that the user has placed the item in the electronic shopping basket for the online marketplace, identify one or more offer redemption codes that correspond to the first URL and the merchant system;

select one of the one or more offer redemption codes that provides the user with greatest savings to apply to the purchase transaction;

provide the selected offer redemption code to the user computing device for auto-completing the form field with the selected offer redemption code and applying the offer redemption code from the autocompleted form field to complete the purchase transaction with the online marketplace;

receive, from the user computing device, information regarding a second load event detected by the user computing device in association with the electronic shopping basket and the online marketplace;

identify, from the information regarding the second load event, the selected offer redemption code and that the user has completed the purchase transaction with the online marketplace; and mark the applied offer redemption code as redeemed in response to detecting that the user has completed the purchase transaction with the online marketplace.

12. The system of claim 11, wherein the processor is further configured to execute application code instructions stored in the storage medium to cause the system to review a browser history for the user, wherein the one or more offer redemption codes comprise offer redemption codes corresponding to an item from the browser history of the user and an identity of the online marketplace.

* * * * *